No. 824,059.
PATENTED JUNE 19, 1906.
A. BESS.
AUTOMATIC GUIDE FOR ENDLESS APRONS.
APPLICATION FILED SEPT. 7, 1905.
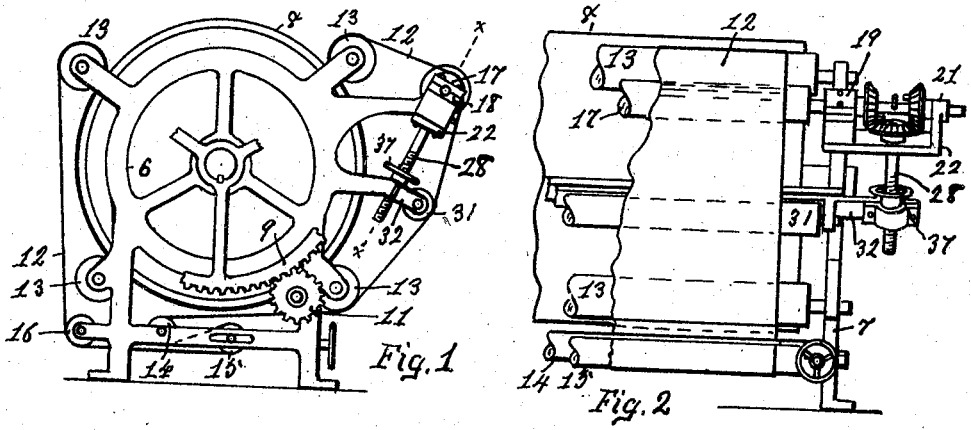
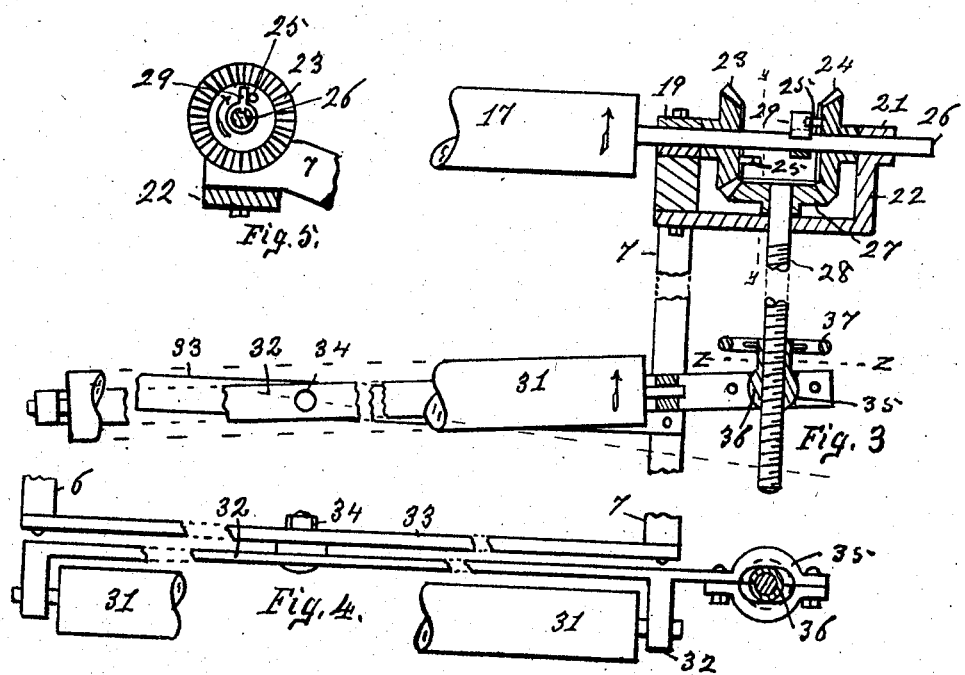
WITNESSES,
James J. Carr.
Mary E. Carr.
Albert Bess, INVENTOR,
By Robert S. Carr,
Atty.

UNITED STATES PATENT OFFICE.

ALBERT BESS, OF HAMILTON, OHIO.

AUTOMATIC GUIDE FOR ENDLESS APRONS.

No. 824,059.        Specification of Letters Patent.        Patented June 19, 1906.

Original application filed January 21, 1905, Serial No. 242,056. Divided and this application filed September 7, 1905. Serial No. 277,298.

*To all whom it may concern:*

Be it known that I, ALBERT BESS, a citizen of the United States, residing at Hamilton, Butler county, Ohio, have invented a new and useful Improvement in Automatic Guides for Endless Aprons, of which the following is a specification.

My invention relates to automatic guides for endless aprons of the class adapted to use in mangles, paper-mills, or elsewhere, and this application is a division of my application filed January 21, 1905, Serial No. 242,056.

The objects of my improvement are to utilize the longitudinal and rotative movements of a roll to automatically engage or disengage and actuate reversible mechanism adapted to change the angle of a pivotally-supported guide-roll in relation to the direction of travel of an endless apron in contact therewith and to provide adjustable swivel connections between the guide-roll and said mechanism.

These objects are attained in the following-described manner, as illustrated in the accompanying drawings, in which—

Figures 1 and 2 are end and front elevations, respectively, with parts broken away, of a mangle embodying my improvement; Fig. 3, an elevation with parts in section on the line $x\ x$ of Fig. 1; Fig. 4, a plan with parts in section on the line $z\ z$ of Fig. 3 of the guide-roll and housing connections, and Fig. 5 a vertical section on the line $y\ y$ of Fig. 3.

In the drawings, 6 and 7 represent the end frames of a mangle, 8 the cylindrical drier journaled therein and rotated by means of gear-wheel 9 from driving-pinion 11. An endless apron 12 partially encircles the drier under padded pressure-rolls 13 and over tightening-rolls 14 and 15 and idle supporting-rolls 16 and 17, all being constructed and arranged in the ordinary manner. Idle supporting-roll 17 is journaled and longitudinally movable in fixed bearings 18 and 19 and bearing 21 on fixed bracket 22.

Bevel-gears 23 and 24, each having a clutch member 25 on its face, are mounted to turn idly on extended journal 26 of roll 17 contiguous to the respective bearings 19 and 21. They are in continuous mesh with bevel-gear 27, which is secured on screw 28 and journaled thereby in bracket 22. Clutch members 29, secured on journal 26 between the bevel-gears thereon, are movable into or out of engagement with the respective said gears by the longitudinal movements of said journal and roll 17. Gear 27, together with screw 28, may be rotated in opposite directions by the respective gears 23 and 24.

Guide-roll 31, journaled on housing 32, is pivotally supported thereby on fixed bar 33 by means of bolt 34. A socket 35 in one end of the housing forms a swivel-joint with spherical nut 36 therein, which is adjustably threaded on screw 28 and provided with hand-wheel 37, whereby it may be turned in the socket to adjust it on the screw.

In operation the guide-roll 31 should be adjusted on the pivot to maintain the apron in its normal direction of travel, with the clutch members on the journal of the idle supporting-roll 17 midway between the bevel-gears thereon and out of engagement with either of them. Any lateral deviation of the apron from its normal direction of travel will move the idle roll 17 longitudinally in the same direction. Should the movement of said roll be sufficient to cause either of the clutch members on the journal to be carried into engagement with the adjacent bevel-gear thereon, rotary motion will thereby be imparted to the intermediate bevel-gear and screw in the proper direction to change the angle of the guide-roll on the pivot and reverse the lateral movement of the apron which will carry the idle roll with the clutch member out of engagement with the bevel-gear. In this manner the lateral movement of the apron may be automatically confined within predetermined limits.

Having fully described my improvement, what I claim as my invention, and desire to secure by Letters Patent of the United States, is—

1. The combination of a pivotally-supported housing, a roll thereon, a longitudinally-movable roll, and means actuated thereby to change the angle of the housing on the pivot.

2. The combination of a pivotally-supported housing, a roll journaled thereon, a roll movable longitudinally and journaled in fixed bearings, and screw mechanism automatically engaged and actuated intermittently thereby to change the angle of the housing on the pivot.

3. The combination of a housing pivotally supported at a fixed point, a roll journaled thereon, a roll journaled and longitudinally movable in fixed bearings, and screw-reversing mechanism adapted to be automatically engaged and actuated thereby to move the housing in opposite directions on the pivot.

4. The combination of a housing movable on a pivot and provided with an adjustable socket in one end portion, a screw, and a spherical nut adjustably threaded thereon and movable within the socket.

5. The combination of an endless apron, a supporting-roll therefor responding longitudinally to the lateral movements of the apron, a pivotally-supported housing, a guide-roll thereon in contact with the apron, a screw arranged to move the housing, and reversing mechanism therefor arranged to be automatically engaged and disengaged by the longitudinal movements and actuated by the rotative movement of said roll.

ALBERT BESS.

Witnesses:
GRACE WEHRLE,
R. S. CARR.